United States Patent
Stubbs et al.

(10) Patent No.: US 10,977,712 B2
(45) Date of Patent: Apr. 13, 2021

(54) COGNITIVE SYSTEM AND METHOD TO PROVIDE MOST RELEVANT PRODUCT REVIEWS TO SPECIFIC CUSTOMER WITHIN PRODUCT BROWSE EXPERIENCE

(71) Applicant: International Business Machines Corporation, Armonk, NY (US)

(72) Inventors: Peter Edward Stubbs, Georgetown, MA (US); Raghuveer Prasad Nagar, Kota (IN)

(73) Assignee: International Business Machines Corporation, Armonk, NY (US)

( * ) Notice: Subject to any disclaimer, the term of this patent is extended or adjusted under 35 U.S.C. 154(b) by 175 days.

(21) Appl. No.: 16/109,150

(22) Filed: Aug. 22, 2018

(65) Prior Publication Data
US 2020/0065878 A1   Feb. 27, 2020

(51) Int. Cl.
   *G06Q 30/00*   (2012.01)
   *G06Q 30/06*   (2012.01)
   *G06Q 30/02*   (2012.01)
   *G06F 16/9535*   (2019.01)

(52) U.S. Cl.
   CPC ..... *G06Q 30/0631* (2013.01); *G06F 16/9535* (2019.01); *G06Q 30/0282* (2013.01)

(58) Field of Classification Search
   CPC .................................................... G06Q 30/00
   See application file for complete search history.

(56) References Cited

U.S. PATENT DOCUMENTS

| | | |
|---|---|---|
| 8,930,366 B2 | 1/2015 | Rappoport et al. |
| 9,342,930 B1 * | 5/2016 | Kraft ..................... G06T 19/006 |
| 9,607,325 B1 * | 3/2017 | Sriram ............... G06Q 30/0282 |
| 10,410,125 B1 * | 9/2019 | Finkelstein ............. G06F 16/35 |
| 2006/0143158 A1 | 6/2006 | Ruhl et al. |
| 2010/0125531 A1 | 5/2010 | Wong |
| 2011/0040759 A1 * | 2/2011 | Rappoport .......... G06F 16/3334 |
| | | 707/737 |

(Continued)

OTHER PUBLICATIONS

Perez, Sarah, "Walmart Launches Shopycat, a social gift finder built on top of Facebook", Techcrunch.com, dated : Nov. 30, 2011. (Year: 2011).*

(Continued)

*Primary Examiner* — Mark A Fadok
(74) *Attorney, Agent, or Firm* — North Shore Patents, P.C.; Michele Liu Baillie (57) ABSTRACT

In providing product reviews relevant to a specific user, a server determines that a user is viewing a current product on a website. The website includes a plurality of product reviews for the current product. In response, the server automatically collects criteria specifically for the user, where the criteria describe the current and past website browsing behavior of the user. The server applies weights to one or more of the criteria, where the weights are specific to the user. The server ranks the plurality of product reviews based on the weighted criteria and sends the rankings of the plurality of product reviews to a web server hosting the website. The plurality of product reviews is displayed on the website according to the rankings. The relevancy rankings can vary between users and thus the display of the most relevant product reviews can vary between users.

18 Claims, 3 Drawing Sheets

(56) References Cited

U.S. PATENT DOCUMENTS

| | | | |
|---|---|---|---|
| 2012/0166354 A1* | 6/2012 | Bank | G06Q 30/0282 |
| | | | 705/347 |
| 2012/0278127 A1 | 11/2012 | Kirakosyan et al. | |
| 2012/0310966 A1* | 12/2012 | Kumar | G06F 16/3322 |
| | | | 707/767 |
| 2013/0066800 A1 | 3/2013 | Falcone et al. | |
| 2013/0117261 A1* | 5/2013 | Sambrani | G06F 16/9535 |
| | | | 707/734 |
| 2015/0317717 A1 | 11/2015 | Olebe | |
| 2016/0314507 A1 | 10/2016 | Tedjamulia et al. | |
| 2017/0140036 A1* | 5/2017 | Owens | G06N 20/00 |

OTHER PUBLICATIONS

"Amazon Will Now Rank Reviews It Thinks Are More Relevant for Customers", https://www.sellerlabs.com/blog/machine-learning/, retrieved Aug. 2, 2018.
Flipkart, https://www.flipkart.com/, retrieved Aug. 2, 2018.
Zhang, Richong et. al., "An Entropy-Based Model for Discovering the Usefulness of Online Product Reviews," WI-IAT 08 Proceedings of the 2008 IEEE/WIC/ACM International Conference on Web Intelligence and Intelligent Agent Technology; vol. 01, pp. 759-762.

* cited by examiner

COGNITIVE SYSTEM AND METHOD TO PROVIDE MOST RELEVANT PRODUCT REVIEWS TO SPECIFIC CUSTOMER WITHIN PRODUCT BROWSE EXPERIENCE

BACKGROUND

Product reviews are critical for online shoppers and influence the purchasing decisions of visitors to a website or application. When viewing product details as part of a browsing experience on a website/application, users are typically given the same view of the product details with some static mechanism for displaying product reviews. Some products have numerous reviews, numbering in the hundreds and even thousands. These reviews are typically sorted by most recent. Some websites/applications allow product reviews to be marked "helpful" by users, and the reviews collectively rated most helpful are then sorted and displayed at the top of the list of reviews. Some websites/applications provide basic sorting options that can be set by the user. However, none of these websites rank product reviews for a specific user who is currently browsing the website/application. Therefore, the user may have difficulty finding reviews that are actually helpful to them.

SUMMARY

Disclosed herein is a method for providing product reviews relevant to a specific user of a website and a computer program product and system as specified in the independent claims. Embodiments of the present invention are given in the dependent claims. Embodiments of the present invention can be freely combined with each other if they are not mutually exclusive.

According to an embodiment of the present invention, in providing product reviews relevant to a specific user, a server determines that a user is viewing a current product on a website. The website includes a plurality of product reviews for the current product. In response, the server automatically collects criteria specifically for the user, where the criteria describe the current and past website browsing behavior of the user. The server applies weights to one or more of the criteria, where the weights are specific to the user. The server ranks the plurality of product reviews based on the weighted criteria and sends the rankings of the plurality of product reviews to a web server hosting the website. The plurality of product reviews is displayed on the website according to the rankings. The relevancy rankings can vary between users and thus the display of the most relevant product reviews can vary between users.

DETAILED DESCRIPTION

Figure 1:
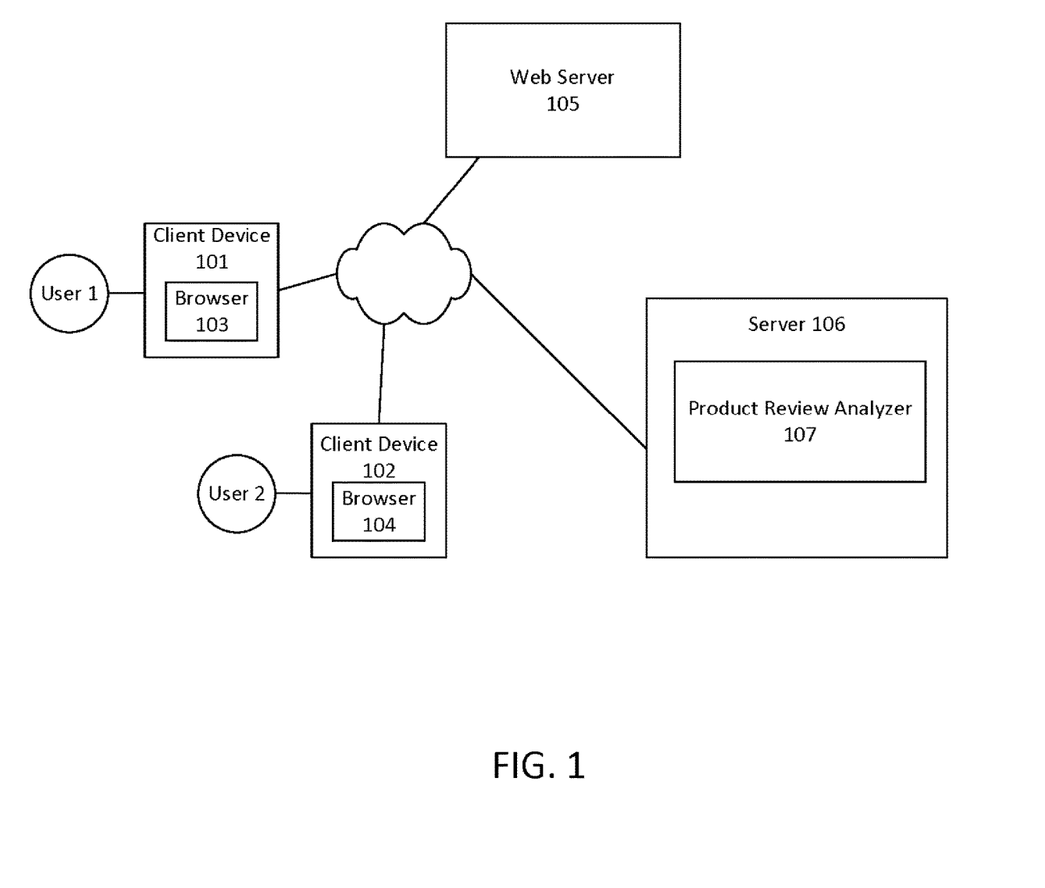
FIG. 1 illustrates an exemplary network environment according to some embodiments.

FIG. 1 illustrates an exemplary network environment according to some embodiments. The environment includes one or more users (User 1 and User 2) with access to a website hosted by a web server 105, via browsers 103-104 on client devices 101-102, on which users may view product details. The website integrates an embodiment of the product review service provided by a server 106, which includes a product review analyzer 107. The product review analyzer 107 collects data or criteria specific to a user (e.g. User 1 or User 2) who is currently viewing details of a specific product on a website. The criteria are collected automatically and without user intervention. The criteria collected describes the current and past website browsing behavior of the user. The product review analyzer 107, using the set of criteria, ranks the product reviews of a product currently being viewed on the website by the user. The product review analyzer 107 sends the rankings of the product reviews to the web server 105, where the product reviews are then displayed on the website according to the rankings. In this manner, product reviews that are relevant to the specific user can be automatically identified and displayed. No manual entry or availability of user profile data is necessary. The functionalities of the components of the environment are described in further detail below.

Figure 2:
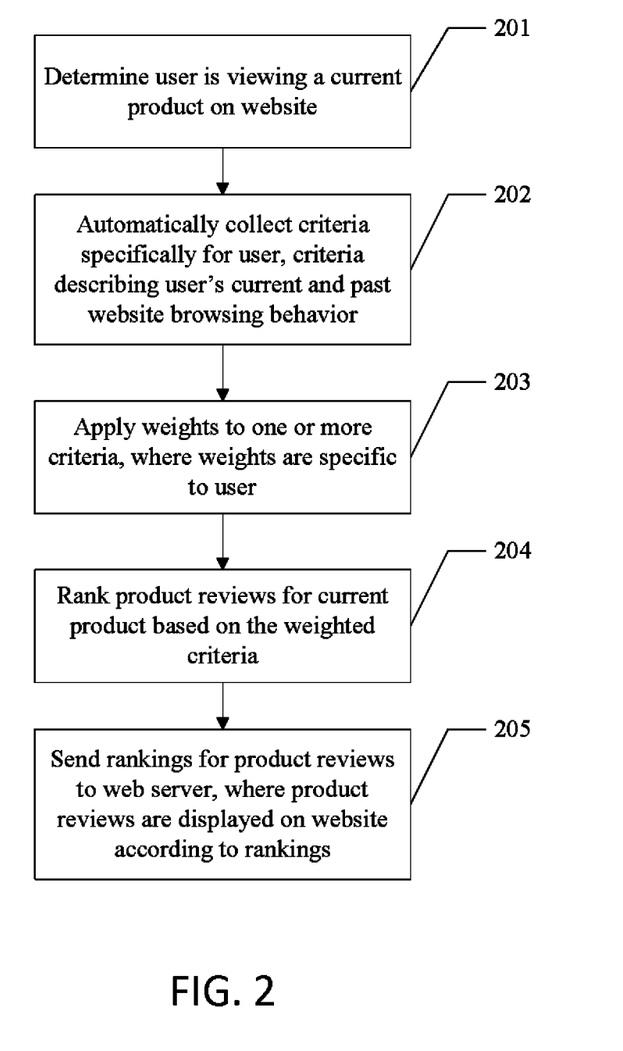
FIG. 2 illustrates an exemplary method for providing product reviews relevant to a specific user, according to some embodiments.

FIG. 2 illustrates an exemplary method for providing product reviews relevant to a specific user, according to some embodiments. When the server 106 determines that the user is viewing a specific/current product on a website (201), such as by receiving a request whenever the user navigates to the product details on the website or a mobile application, the product review analyzer 107 automatically, without user intervention, collects criteria specifically for the user, where the criteria describes at least the user's current and past website browsing behavior (202). The product review analyzer 107 applies weights to one or more of the criteria, where the weights are specific to the user (203). The product review analyzer 107 ranks product reviews for the current product based on the weighted criteria (204). The product review analyzer 107 then sends the rankings for the product reviews to the web server 105, where the product reviews are displayed on the website according to the rankings (205).

Per block 202, in some embodiments, the criteria collected by the product review analyzer 107 includes, but are not limited to, some combination of the following: search terms (e.g. keywords) entered by the user; specific products user has recently viewed; product reviews created by the user; and product reviews created by other users that the user previously found helpful, such as by indicating a "like", a "helpful", or a "thumbs up". Optionally, when the user accesses the product details through a reference link, the reference link or information contained therein can be part of the criteria. If the user conducted a search, the keywords entered by the user can often indicate which product reviews of the current product would be most relevant to the user. For example, if the keywords appear in the text of a product review, then that product review is likely to be more relevant than product reviews where the keywords do not appear. The user's browsing history, containing a list of products that the user recently viewed, can also indicate which product reviews of the current product would be relevant. For example, when any of the product's names are mentioned in a product review, then that product review may be more relevant to the user than product reviews that do not mention the product's name. Other product reviews created by the user for similar products can be used to determine which product reviews of the current product are likely to be relevant. For example, when the product reviews for the current product contain similar keywords found in these other product reviews created by the user, then these product reviews for the current product are likely to be more relevant than product reviews that do not include similar keywords and phrases. Product reviews for other products which the user has marked as "helpful" or "liked" can be used to determine relevancy of the product reviews for the current product. For example, when a user that created the "liked" product review also submitted a product review for the current product, then this other user's product review of the current product is likely to be more relevant to the user than reviews submitted by other users. The product reviews that are considered to be more relevant are thus ranked higher by the product review analyzer 107.

Optionally, other criteria may additionally be used to identify the most relevant product reviews. The other criteria may include, but are not limited to, any combination of the following. The user's order history can be another criteria. In one exemplary embodiment, when a product review of the current product is created by another user who has purchased products with similar attributes as the current product, then this product review is likely more relevant than other product reviews. When the user's profile is available, the profile data can another criteria. In one exemplary embodiment, a product review of the current product created by other users with similar profiles is likely to be more relevant than product reviews created by users with dissimilar profiles. Example profile data can include gender, age, income, profession, and geographic data. The user's social media activities can be additional criteria. In one exemplary embodiment, the server 106 interfaces with one or more social media platforms and requests public messages posted by the user. The server 106 parses the messages to identify specific messages that relate to the current product or similar products. Keywords are then extracted from these specific messages, and these keywords are part of the set of criteria. In one exemplary embodiment, the person for whom the user is shopping for can be an additional criterion. A product review of the current product with attributes that match attributes of the person for whom the user is shopping for is likely to be more relevant than other product reviews.

Per block 203, once the criteria specifically for the user are collected, the product review analyzer 107 applies a weight to each criterion. Optionally, the weight of each criteria is configurable by the administrator of the website, giving the owner control over how product reviews are ranked on their website. In some embodiments, a cognitive learning system is used to improve the logic of determining the most relevant product reviews. In one exemplary embodiment, whenever the user marks a product review as helpful, the product review is analyzed to determine which of the user's criteria match the attributes of the product review. The weight of these criteria can then be adjusted to make the criteria more important. Similarly, when the user marks a product review as unhelpful, the weight of the matching criteria can be adjusted to make the criteria less important. This allows the server 106 to "learn" and improve the criteria and weights used to determine the relevancy of product reviews, thus increasing its accuracy over time.

Per block 204, when the user views the current product on the website, the product review analyzer 107 compares the user's criteria with attributes of the product reviews for the current product. The product review analyzer 107 then calculates a relevancy score for each product review according to the weight associated with each criterion.

Per block 205, in displaying the product reviews on the website, the highest ranking product reviews are highlighted. Any number of techniques can be used to highlight the highest ranking product reviews, such as using a specific/different font, color, images, etc. The highest ranking product reviews can also be highlighted by placement, such as by displaying them separately from the other product reviews and/or at the top of the website. Optionally, an indication of why a particular product review is being highlighted may be displayed with the product review. In one exemplary embodiment, a description of the cognitive insight used to determine the relevancy is displayed, e.g. "This review includes terms you used in the search", "Based on your feedback on your recently purchased laptop, this review may be useful to you". Providing the user with the description enhances the user experience with the product reviews and gives more meaning to the highlighting of the product reviews.

Consider a first example. Assume that the user wishes to buy a mobile phone. The user enters the website and enters search terms, such as "mobile phone great camera". From the search results, the user selects mobile phone #1 and views details for mobile phone #1 (201). Previous to viewing mobile phone #1, the user viewed the details for mobile phone #2. While viewing the details for mobile phone #1, the product review analyzer 107 collects the user's criteria (202) and applies weights to the criteria (203). Since the search terms include "camera", the product review analyzer 107 determines that "camera" is an important criteria and applies a weight to make "camera" more important than other criteria. Assume that mobile phone #1 has 100 reviews. The product review analyzer 107 ranks these 100 reviews (204). The product review analyzer 107 determines that 30 of the 100 product reviews mention the term "camera", and in response, the relevancy score of these 30 product reviews are increased. Of these 30 product reviews, one product review was written by another user, who had written reviews of other products that the user found to be "helpful". The product review analyzer 107 thus increases the relevancy score of this one product review further. Another of the 30 product reviews also mentioned mobile phone #2, and in response, the relevancy score of this product review is increased further. The rankings for the product reviews are then sent to the web server 105 to be used in displaying the product reviews on the website (205). In this example, assume that the 30 product reviews are sorted in order of their relevancy score, with the most relevant (highest relevancy score) displayed first. On the product details page for mobile phone #1, the sorted 30 product reviews are displayed with a different font or color than the remainder of the product reviews. In addition, the website displays information next to the reviews concerning why the review is potentially helpful to the user. For example, the information may state, "This review mentions 'camera'", or "This review mentions a product you recently viewed", or "This review was written by a user whose review you found useful in the past."

Consider a second example. Assume that the user wishes to buy a 3D television. The user's browsing history indicates that the user has used "reliable", "HDMI", and "color depth" in previous searches. The user then enters a website and enters "smart 3D TV" as search terms, selects a particular television, and views details for a particular television (201). While viewing the details for the television, the product review analyzer 107 collects the user's criteria (202) and applies weights to the criteria (203). Based on the user's browsing history, the keywords "reliable", "HDMI", "color depth", "smart", and "3D" are given more weight. Assume that the particular television has 2,542 reviews. The product review analyzer 107 ranks these 2,542 reviews (204). Optimizations techniques can be applied, such as filtering the reviews before performing the ranking. When a review mentions one of the weighted keywords, the relevancy score of the review is increased. Assume that the product review analyzer 107 ranks 196 product reviews higher than the remainder of the 2,542 reviews for mentioning at least one of the keywords, ranks 96 reviews even higher for containing two or more of the keywords, and ranks 4 reviews highest for mentioning all of the keywords. The product review analyzer 107 sends the rankings to the web server 105 (205), and the 4 reviews are displayed on the website. In this example, the 4 reviews are highlighted and displayed with information concerning why the review is potentially helpful to the user. For example, the information may state, "This review mentions keywords you used in your reviews of similar products" or "This review contains keywords you used while searching". Assume that the user marks one of the 4 reviews as "helpful". The server 106 analyzes this particular review to determine which of the keywords are mentioned in this product review. The weight of these keywords are then adjusted to make the keywords more important in subsequent analyses.

In the above described manner, embodiments of the present invention rank the relevancy of product reviews for a specific user, allowing for the display of the most relevant product reviews to the user. The relevancy rankings can vary between users and thus the display of the most relevant product reviews can vary between users. Embodiments of the present invention makes product reviews more meaningful to users and could potentially lead to faster sales. Embodiments of the present invention will also improve website performance by reducing the load on the web server 105 as users spend less time browsing the product reviews.

Figure 3:
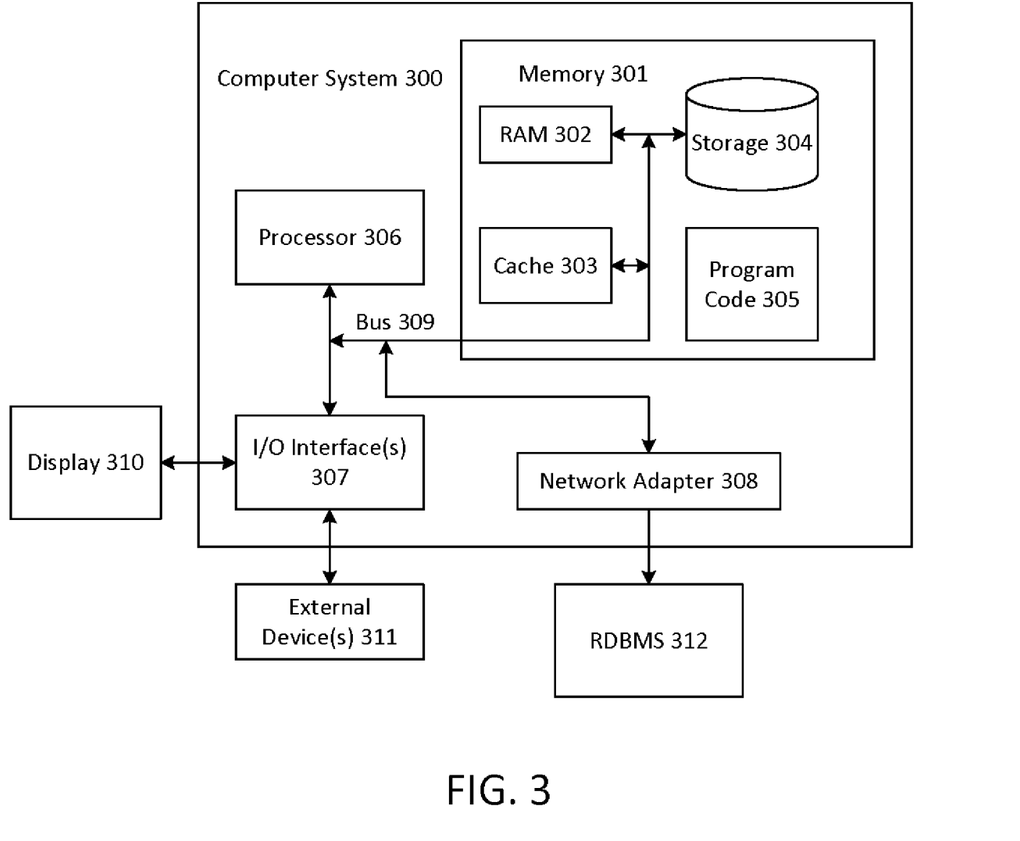
FIG. 3 illustrates a computer system according to embodiments of the present invention.

FIG. 3 illustrates a computer system according to embodiments of the present invention. One or more of the computer system 300 is used to implement the server 106 and its components. The computer system 300 is operationally coupled to a processor or processing units 306, a memory 301, and a bus 309 that couples various system components, including the memory 301 to the processor 306. The bus 309 represents one or more of any of several types of bus structure, including a memory bus or memory controller, a peripheral bus, an accelerated graphics port, and a processor or local bus using any of a variety of bus architectures. The memory 301 may include computer readable media in the form of volatile memory, such as random access memory (RAM) 302 or cache memory 303, or non-volatile storage media 304. The memory 301 may include at least one program product having a set of at least one program code module 305 that are configured to carry out the functions of embodiment of the present invention when executed by the processor 306. The computer system 300 may also communicate with one or more external devices 311, such as a display 310, via I/O interfaces 307. The computer system 300 may communicate with one or more networks via network adapter 308.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing product reviews relevant to a specific user comprising:
    determining, by a server, that a user is viewing a current product on a website, the website comprising a plurality of product reviews for the current product;
    in response, automatically collecting criteria specifically for the user, the criteria comprises attributes of a person for whom the user is shopping for and attributes describing current and past website browsing behavior of the user;
    applying weights to one or more of the criteria, wherein the weights are specific to the user and to the person for whom the user is shopping for;
    comparing one or more keywords in each of the plurality of product reviews with the attributes of the person for whom the user is shopping for;
    ranking the plurality of product reviews based on the weighted criteria, wherein each product review with the one or more keywords matching the attributes of the person for whom the user is shopping for are ranked as more relevant than other product reviews of the plurality of product reviews; and
    sending the rankings of the plurality of product reviews to a web server hosting the website, wherein the plurality of product reviews is displayed on the web site according to the rankings.

2. The method of claim 1, wherein the criteria comprising the attributes describing the current and past website browsing behavior of the user are selected from a group consisting of: one or more search terms entered by the user; one or more specific products viewed by the user; one or more product reviews created by the user; and one or more product reviews created by other users that the user found helpful.

3. The method of claim 2, wherein the criteria comprising the attributes describing the current and past website browsing behavior of the user are selected from the group further consisting of: an order history of the user; a profile of the user; and social media activities of the user.

4. The method of claim 1, wherein the applying of the weights to the one or more criteria comprises:
    determining that the user marked a given product review of the plurality of product reviews as helpful;
    analyzing the given product review to extract one or more keywords of the given product review;
    determining which of the criteria comprising the attributes of the person for whom the user is shopping for matches the one or more keywords of the given product review; and
    for each given criteria comprising the attributes of the person for whom the user is shopping for matching the one or more keywords of the given product review, increasing the weight applied to the given criteria.

5. The method of claim 1, wherein the ranking of the plurality of product reviews based on the weighted criteria comprises:
    comparing the criteria comprising the attributes of the person for whom the user is shopping for with the one or more keywords of each of the plurality of product reviews; and
    calculating a relevancy score for each of the plurality of product reviews based on the comparing.

6. The method of claim 1, further comprising:
    sending a description of a cognitive insight used to determine the ranking of a given product review to the web server, wherein the cognitive insight is displayed on the website.

7. A computer program product for providing product reviews relevant to a specific user, the computer program product comprising a computer readable storage medium having program instructions embodied therewith, the program instructions executable by a processor to cause the processor to:

determine that a user is viewing a current product on a website, the website comprising a plurality of product reviews for the current product;

in response, automatically collect criteria specifically for the user, the criteria comprises attributes of a person for whom the user is shopping for and attributes describing current and past website browsing behavior of the user;

apply weights to one or more of the criteria, wherein the weights are specific to the user and to the person for whom the user is shopping for;

compare one or more keywords in each of the plurality of product reviews with the attributes of the person for whom the user is shopping for;

rank the plurality of product reviews based on the weighted criteria, wherein each product review with one or more keywords matching the attributes of the person for whom the user is shopping for are ranked as more relevant than other product reviews of the plurality of product reviews; and send the rankings of the plurality of product reviews to a web server hosting the website, wherein the plurality of product reviews is displayed on the web site according to the rankings.

8. The computer program product of claim 7, wherein the criteria comprising the attributes describing the current and past website browsing behavior of the user are selected from a group consisting of: one or more search terms entered by the user; one or more specific products viewed by the user; one or more product reviews created by the user; and one or more product reviews created by other users that the user found helpful.

9. The computer program product of claim 8, wherein the criteria comprising the attributes describing the current and past website browsing behavior of the user are selected from the group further consisting of: an order history of the user; a profile of the user; and social media activities of the user.

10. The computer program product of claim 7, wherein the applying of the weights to the one or more criteria comprises:
  determine that the user marked a given product review of the plurality of product reviews as helpful;
  analyze the given product review to extract one or more keywords of the given product review;
  determine which of the criteria comprising the attributes of the person for whom the user is shopping for matches the one or more keywords of the given product review; and
  for each given criteria comprising the attributes of the person for whom the user is shopping for matching the one or more keywords of the given product review, increase the weight applied to the given criteria.

11. The computer program product of claim 7, wherein the ranking of the plurality of product reviews based on the weighted criteria comprises:
  compare the criteria comprising the attributes of the person for whom the user is shopping for with the one or more keywords of each of the plurality of product reviews; and
  calculate a relevancy score for each of the plurality of product reviews based on the comparing.

12. The computer program product of claim 7, further comprising:
  send a description of a cognitive insight used to determine the ranking of a given product review to the web server, wherein the cognitive insight is displayed on the website.

13. A system comprising:
a processor; and
a computer readable storage medium having program instructions embodied therewith, the program instructions executable by a processor to cause the processor to:
  determine that a user is viewing a current product on a website, the website comprising a plurality of product reviews for the current product;
  in response, automatically collect criteria specifically for the user, the criteria comprises attributes of a person for whom the user is shopping for and attributes describing current and past web site browsing behavior of the user;
  apply weights to one or more of the criteria, wherein the weights are specific to the user and to the person for whom the user is shopping for;
  compare one or more keywords in each of the plurality of product reviews with the attributes of the person for whom the user is shopping for;
  rank the plurality of product reviews based on the weighted criteria, wherein each product review with the one or more keywords matching the attributes of the person for whom the user is shopping for are ranked as more relevant than other product reviews of the plurality of product reviews; and
  send the rankings of the plurality of product reviews to a web server hosting the website, wherein the plurality of product reviews is displayed on the web site according to the rankings.

14. The system of claim 13, wherein the criteria comprising the attributes describing the current and past website browsing behavior of the user are selected from a group consisting of: one or more search terms entered by the user; one or more specific products viewed by the user; one or more product reviews created by the user; and one or more product reviews created by other users that the user found helpful.

15. The system of claim 14, wherein the criteria comprising the attributes describing the current and past website browsing behavior of the user are selected from the group further consisting of: an order history of the user; a profile of the user; and social media activities of the user.

16. The system of claim 13, wherein the applying of the weights to the one or more criteria comprises:
  determine that the user marked a given product review of the plurality of product reviews as helpful;
  analyze the given product review to extract one or more keywords of the given product review;
  determine which of the criteria comprising the attributes of the person for whom the user is shopping for matches the one or more keywords of the given product review; and
  for each given criteria comprising the attributes of the person for whom the user is shopping for matching the one or more keywords of the given product review, increase the weight applied to the given criteria.

17. The system of claim 13, wherein the ranking of the plurality of product reviews based on the weighted criteria comprises:
  compare the criteria comprising the attributes of the person for whom the user is shopping for with the one or more keywords of each of the plurality of product reviews; and
  calculate a relevancy score for each of the plurality of product reviews based on the comparing.

18. The system of claim 13, further comprising:
 send a description of a cognitive insight used to determine the ranking of a given product review to the web server, wherein the cognitive insight is displayed on the website.

* * * * *